United States Patent [19]

Conlee

[11] 3,774,295
[45] Nov. 27, 1973

[54] METHOD OF FORMING A WORM SHAFT

[76] Inventor: George D. Conlee, Colonial House — Apt. 6, Highway 169 South, Humboldt, Iowa

[22] Filed: Jan. 26, 1972

[21] Appl. No.: 220,798

Related U.S. Application Data

[62] Division of Ser. No. 127,200, March 23, 1971, Pat. No. 3,736,483.

[52] U.S. Cl............ 29/456, 29/157.3 AH, 29/159.2, 29/523, 74/458
[51] Int. Cl............................................. B23p 11/00
[58] Field of Search............ 29/456, 523, 157.3 AH, 29/159.2; 74/458; 318/469

[56] References Cited
UNITED STATES PATENTS

| 511,269 | 12/1893 | Holmes | 74/458 X |
|---|---|---|---|
| 1,436,072 | 11/1922 | Allis | 74/458 X |
| 2,004,389 | 6/1935 | Jones | 29/157.3 AH |
| 2,724,979 | 11/1955 | Cross | 74/458 |
| 3,163,054 | 12/1964 | Werner | 74/458 X |
| 3,186,082 | 6/1965 | Ulrich et al. | 29/456 |
| 3,487,709 | 1/1970 | Zieber | 74/458 X |

FOREIGN PATENTS OR APPLICATIONS

| 292,580 | 4/1929 | Great Britain | 29/523 |

Primary Examiner—Charlie T. Moon
Attorney—Zarley, McKee & Thomte

[57] ABSTRACT

The output shaft of a motor is connected directly to a worm shaft which moves a traveler connected to the door. The motor includes a second centrifugal switch in the relay coil circuit whereby the motor will stop upon the door engaging stops in either direction. The worm shaft includes a length of spiral wire locked in place on thin wall tubing rectangular in cross section. The method of producing the worm shaft includes placing the length of spiral wire on a length of cylindrical tubing and then applying pressure to the tuning between adjacent coils causing corners to be formed which lockingly engage the wire coils. A predetermined axial force in either direction on the motor will cause the motor to move relative to the traveler and actuate an interrupter switch and a reversing switch thereby stopping the motor. Upon the relay coil being reactivated the motor will then move in the opposite direction to the end of the cycle where it will then shut off and be ready to repeat the cycle.

4 Claims, 10 Drawing Figures

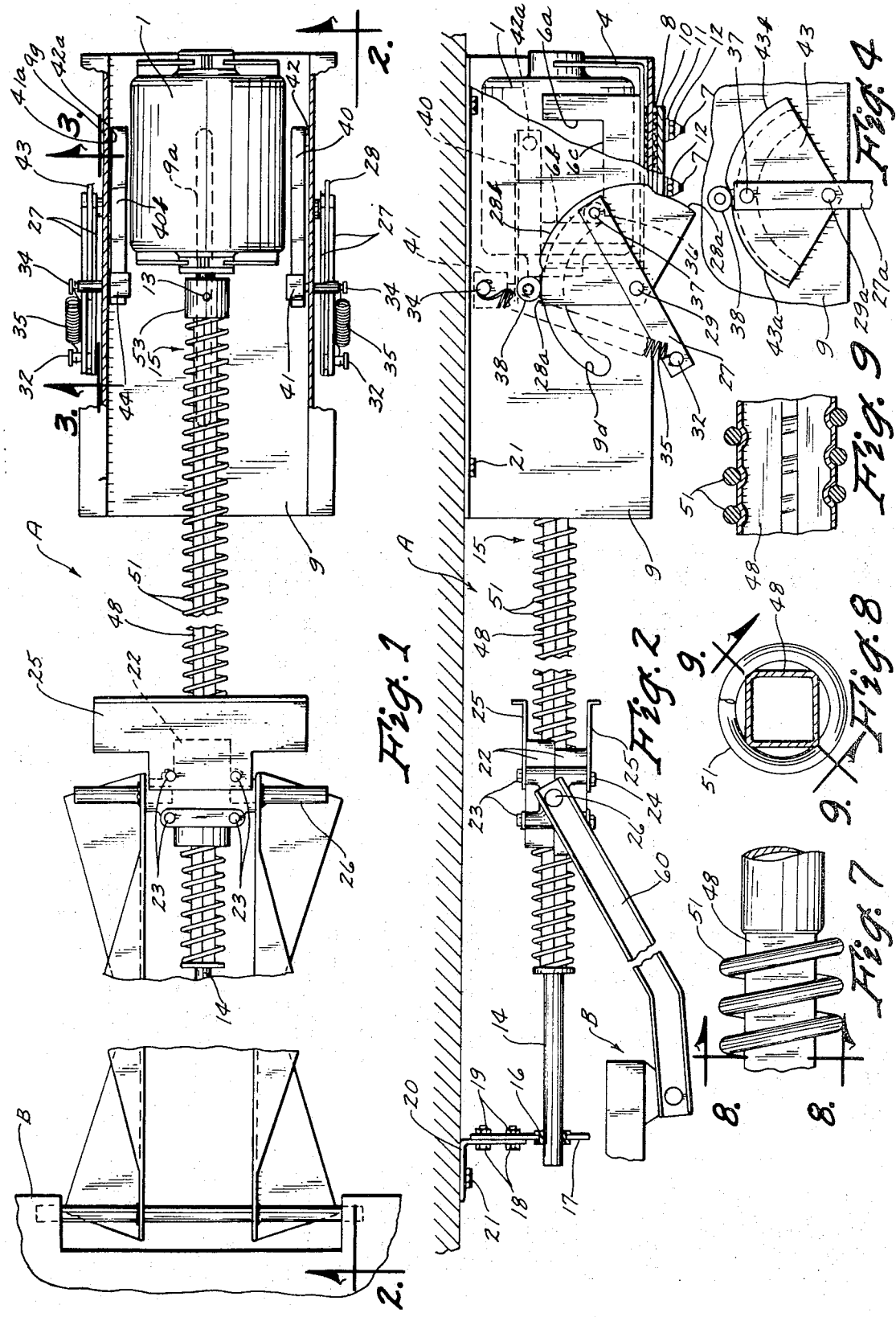

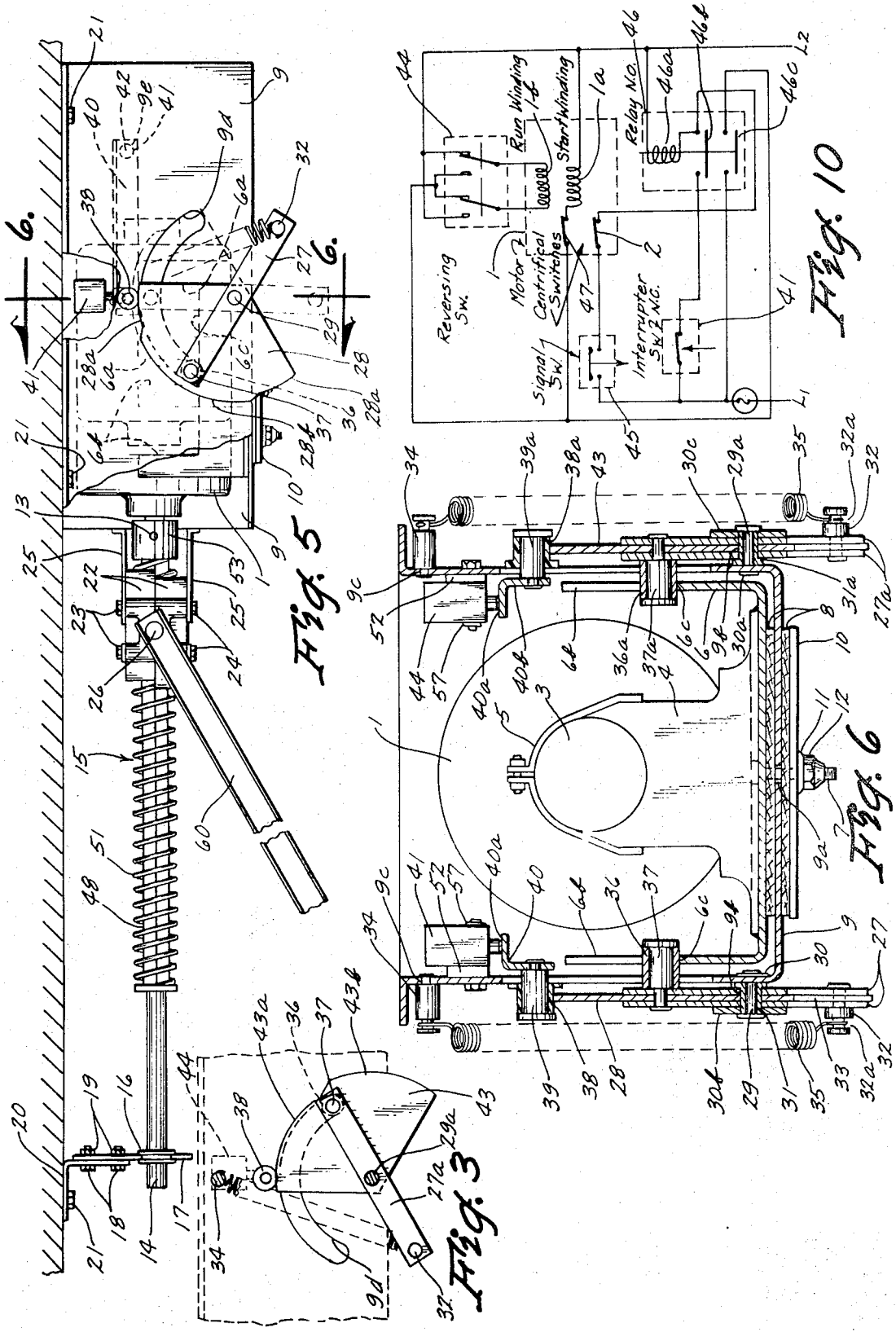

METHOD OF FORMING A WORM SHAFT

This is a divisional application of Ser. No. 127,200 filed Mar. 23, 1971, now U.S. Pat. No. 3,736,483.

This invention is a device for operating overhead garage doors or the like, powered by an electric motor, or the like, and having controls that can be triggered from a detached location such as a radio transmitter in an auto or the like.

Devices of this nature are presently made and sold. This door operator represents an improvement in that costs are reduced by the elimination of parts. Most of the present devices are all made with a small and large pulley and belt for initial speed reduction. It is usually necessary to reduce the speed even if a worm drive is utilized. The worm of this invention is large enough in diameter to be sufficiently stiff for turning at full 1,725 r.p.m. motor speed and light enough to turn at that speed without imposing undue loads on the unit. Additionally, the unit can be produced for a minimum of cost since it can be direct driven.

More specifically, the worm shaft is made from coiled wire, coiled to a definite lead per spiral and having in internal diameter that rides a free fit over a length of circular in cross section tubing. The length of spiral wire can be placed on the tube without disturbing the spiral windings. The wire spiral is then locked to the tubing so that it cannot move axially thereby enabling it to transmit axial loads when rotated as a worm. The method of locking the coil to the tube utilizes the principle of impossibility of the squared circle whereby no square whose perimeter is equal to the circumference of a circle can be inscribed in the circle. The diagonal of a square inscribed in a circle is approximately 1.1 times the diameter of that circle. Using this principle, and crushing the circle to a square between coils results in the tube bulging out at four places and securing the coil.

Another object of this invention is to use a split phase electric motor having a starting winding and a centrifugal switch which removes the start winding from the circuit at approximately 80 percent of the motor snychronous speed. Motors of the permanent split capacity type are currently used for door openers because they can be instantly reversed. The mechanism of this invention does not require instant reversal. Instead, it depends on an extra centrifugal switch in the relay coil circuit to make sure that the mechanism will go through a complete operation from a single signal impulse, regardless of whether the signal is momentary, continuous or repeated pulses.

Also, the arrangement of this invention permits the door operation to be stopped anywhere that it meets a positive stop such that if a brick is put on the sill the door can be run down and will stop automatically on the brick and remain there. The conventional door opener cannot do this and the motor will reverse causing the door to move in the opposite direction. Thus, the apparatus of this invention includes its own overload safety such that it will stop anywhere it comes to an abutment going in either direction and remain there awaiting a fresh signal.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary plan view of the motorized door opener with the motor moved to its extreme right-hand position and the door in its open position.

FIG. 2 is a side elevation view thereof.

FIG. 3 is a cross sectional view taken along line 3 — 3 in FIG. 1.

FIG. 4 is a fragmentary view of the actuating lever in a dead center position.

FIG. 5 is a view similar to FIG. 1 but showing the motor and actuating assembly moved to the far left position upon the door being fully opened and the motor being shut off.

FIG. 6 is a cross sectional view along line 6 — 6 in FIG. 5.

FIG. 7 is a fragmentary side elevational view of the worm shaft.

FIG. 8 is a cross sectional view taken along line 8—8 in FIG. 7.

FIG. 9 is a cross sectional view taken along line 9 — 9 in FIG. 8; and

FIG. 10 is an electrical schematic for the motorized door opener.

The motorized door opener of this invention is referred to generally in FIG. 1 by the reference letter A and is coupled to an overhead type door B. The door opener A is secured by appropriate fasteners to a ceiling support.

A split-phase electric motor 1 is employed which includes start and run windings, 1a and 1b, respectively, and a centrifugal switch 47 for removing the start winding from the circuit at approximately 80 percent of synchronous speed. In addition, a second centrifugal switch 2 is provided. The motor 1 includes its own internal thrust bearings. It is mounted by standard resilient rings 3 and base 4 and secured by latch assemblies 5. The motor base assembly 4 is secured by welding to the motor saddle 6 which has notches at either side with edges 6a, 6b and 6c.

The motor saddle 6 also includes two threaded studs 7. A woven brake lining pad 8 is provided having clearance holes for studs 7 and is cemented to the bottom of the saddle 6. The studs 7 extend through a slot 9a in the frame 9 and carry an outer brake plate 10 which also has a woven brake lining 8 cemented thereon. Belleville type springs 11 are placed on the studs 7 and brake compression is adjusted by the lock nuts 12. Thus, it is seen that the motor assembly may slide in the frame in the direction indicated by the studs 7 in slot 9a and at an expenditure of energy as dictated by the brake assembly in frictional contact with frame 9.

A worm assembly shaft 15 is secured by a set screw 13 to the motor shaft. The worm assembly 15 will be discussed in detail hereinafter.

The outer end of the worm assembly 15 is provided with a trunnion shaft 14 of such length that it remains in outboard bearing 16 in all positions of motor 1. The outboard bearing 16 is snapped into plate 17 which is secured to and vertically adjusted by screws 18 and nut 19 by clamping it to bracket 20.

The frame 9 and bracket 20 is secured to a building ceiling by screws 21 through holes in the frame 9 and bracket 20. The unit would be aligned on the centerline of the door to be operated and the frame 9 and bracket 20 are spaced appropriately one from the other.

A traveler assembly is movable by the worm assembly and comprises two half nuts 22, identical, but when disposed as shown form a complete internal thread.

The half nuts 22 are joined by bolts 23 and nuts 24, which assembly also secures and positions up stops 25 and journals 26 which are a part of the door connection yoke assembly.

At one side of the frame 9, through holes 9b is secured a lever 27 and an interrupter cam 28 assembly which is pivotal on a stud 29 in a bushing 31 held in place by burr 30. A spacer 30b is provided on the bushing 31. A spring mounting stud 32 is riveted through the bottom end of the lever 27 and spacers 33. The outer end of the stud 32 has a groove 32a for the purpose of securing the eye of an over center extension spring 35 whose other end is secured in like manner at the stud 34 which is secured to frame 9 through hole 9c.

A roller 36 on stud 37 is also secured to the lever/cam assembly such that roller 36 extends inward through slot 9d in frame 9 and into position to engage surfaces 6a, 6b, 6c on the saddle.

The interrupter cam 28 has an external edge composed basically of two radii 28a which is shorter at both ends and 28b the longer for experimentally establishing the arc as the cam passes over center. The interrupter cam edges 28a and 28b contact follower 38 which rolls on pivot 39 which in turn is secured to switch lifter 40 whose other end is pivoted by bushing 41 and stud 42 secured to frame 9 through hole 9e. The switch lifter 40 has an upper surface 40a disposed to contact the operating button of interrupter switch assembly 41 which is a single pole, single throw, normally closed type switch.

At the other side of frame 9, through hole 9b, is secured a lever 27a and motor reversing cam 43 assembly pivoted by a stud 29a, burr 30a, bushing 31a and through a spacer 30c. Except for the motor reversing cam 43 the remainder of parts is the same as the opposite side. The cam 43, however, has two radial surfaces 43a and 43b, the latter being the larger, and a transition section joining them at the center, the region where the over center spring snaps the levers and cam assembly. The cam surfaces 43a and 43b contact follower 38a, which pivots by pivot 39a and operates lifter 40b, pivoted by bushing 41a and stud 42a secured to frame 9 through hole 9g. The upper surface of switch lifter 40b is disposed to operate the plunger of motor reversing switch assembly 44. This switch is a double pole, double throw switch which prepares motor reverse circuit by reversing the running winding leads with respect to the start winding leads.

The worm, which is attached directly to the motor shaft, must be stiff so that a length of eight foot will not whip at speeds of 1,500 to 1,700 r.p.m. and it must have a lead of 0.5 inches in order that a split-phase motor operating at 1,725 r.p.m. will move the traveler at a rate of approximately 1 foot per second. 1,725 ÷ two threads per inch = 862 inches per minute divided by 720 = 1.2 feet per second or 14.4 inches per second.

The use of the precoiled wire makes the cost of the threads low. The threads must be locked onto the tube shaft and this is accomplished by reforming the circular tube between threads. No circumference can be divided into a square that can be inscribed in the original circle. Therefore, a tube of diameter $d$ has a circumference of $\pi d$ which would divide into a square having sides of $\pi d/4$ and the diagonal of this square would be $\sqrt{2}\, \pi d/4$. Setting $d = 1.00$, diagonal = 1.11 the corners must bulge between the threads.

In operation the unit is started with the door closed or down and the motor run windings through the switch 44 being in position for the motor to begin rotating the right-hand helix worm in the right-hand direction using the thumb rule. The motor 1 and saddle 6 are in position shown in FIGS. 1, 2 and 3 with edges 6b against or near to rollers 36 and 36a depending on where the motor coasted to a stop upon preceding operation. A signal, probably by radio, but could be audio, light beam or manual, either momentary, intermittent or continuous, is transmitted closing the signal switch 45, permitting current to flow through L1 through centrifugal switch 2 through coil 46a in relay 46 thereby closing contacts 46b and 46c, the former 46b now provides a second path through coil 46a and holds relay 46 energized and closed. Current then flows through 46c contacts and passes through the centrifugal switch 47 to the start winding 1a and through the reversing switch 44 to run winding 1b and the motor starts in whatever direction was dictated by the position of the switch 44 (assuming this to be a right-hand direction) and motor 1 begins rotating and turning worm assembly 15 in a right-hand direction such as to pull traveler nut assembly 22 towards the motor or the motor towards the traveler nut assembly, whichever calls for the least energy expenditure. The lock nuts 12 are adjusted so that the brake resistance will allow the motor and worm assembly 15 to move with respect to frame 9 toward traveler assembly 22 until surfaces 6a on saddle 6 contact rollers 36 and 36a at which times resistance to further movement of motor 1 and worm shaft 15 increases due to load of the two over center extension springs 35 in leverage against surfaces 6a. This reaction load composed of the motor's weight, spring brake loading and the resultant leverage applied by the over center springs 35 is chosen at a value sufficient to start and move the door, which it does. The worm assembly 15 pulls the traveler assembly 22 which pulls journals 26 which are part of door connection yoke assembly 60 which is attached to the door. This continues until upstops 25 come against frame 9 (fixed) and it becomes impossible to move door further in that direction. The motor 1 is chosen to have enough power so that it can at this time continue to rotate the worm assembly 15 into the traveler nut 22 which is now fixed overcoming the brake friction pads 8 and increasing loads applied by the over center springs 35. As the surfaces 6a of the saddle 6 acting against rollers 36 and 36a begin to move both the interrupter cam and lever assembly 28 the motor reversing cam and lever assembly 43 move toward the centered position as seen in FIGS. 4 and 5. At a predetermined time, as dictated by the shape of the cam 28, in this motion the rise on the cam 28 moves the follower 38 and switch lift lever 40 and opens the circuit through the interrupter switch assembly 41. This interruption occurs at a point just sufficiently in advance of dead center that the motor 1 rotor stored energy functioning as a flywheel will cause the worm shaft 15 to continue to screw into the follower 22 and thereby pull the motor 1 until the saddle 6 surface 6a snaps the roller 36 and cam and lever assemblies 28 and 43 over center whereupon they swing free until rollers 36 contact surfaces 6c of saddle 6. In this over center movement, cam 43, working through switch assembly 44, has prepared the motor for start up in the opposite direction and cam 28 working through switch assembly 41 has interrupted the circuit and allowed the relay 46 to de-energize thereby interrupting the motor circuit. At this time the motor 1 may coast on any stored energy remaining until the same is expended by the brake material 8 or the motor saddle surfaces 6a contacting the rollers 36 and 36a are positively stopped.

Upon the motor 1 dropping in rotational speed to 80 percent of its normal speed the centrifugal switches 2 and 47 will reclose and the apparatus is then ready to receive a signal which will start and run it in the opposite direction.

I claim:

1. The method of forming a worm shaft comprising the steps of inserting a hollow tube into a length of spiral tube, and applying external pressure at uniformly peripherally spaced apart points to said tube between turns of said spiral wire such that said tube is deformed outwardly at corners between said points into locking engagement with said spiral wire.

2. The method of claim 1 wherein said hollow tube is circular in cross section and pressure is applied uniformly around the periphery at four positions such that the resulting tube is square in cross section and engages said spiral wire only at the four corners.

3. The method of claim 2 wherein the cross sectional sizes of said tube and length of spiral wire are such that said tube is loosely positioned in said length of spiral wire prior to pressure being applied.

4. The method of claim 1 wherein the application of pressure to said tube causes said tube to bulge outwardly at said corners between turns of said spiral wire.

* * * * *